United States Patent
Park

(10) Patent No.: US 6,793,266 B2
(45) Date of Patent: Sep. 21, 2004

(54) FUEL FILLER DOOR ASSEMBLY OF A VEHICLE

(75) Inventor: Jae-Hong Park, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/330,399

(22) Filed: Dec. 27, 2002

(65) Prior Publication Data

US 2003/0222476 A1 Dec. 4, 2003

(30) Foreign Application Priority Data

May 31, 2002 (KR) ......................................... 2002-30639

(51) Int. Cl.⁷ .............................................. B60K 15/05
(52) U.S. Cl. .................................. 296/97.22; 220/86.2
(58) Field of Search ............................. 296/97.22, 155; 220/86.2

(56) References Cited

U.S. PATENT DOCUMENTS

| | | | |
|---|---|---|---|
| 3,915,491 A | * 10/1975 | Montgomery | 296/97.22 |
| 4,583,072 A | 4/1986 | Matsushita | |
| 4,659,346 A | * 4/1987 | Uranishi et al. | 96/109 |
| 4,862,856 A | 9/1989 | Yokoe et al. | |
| 4,926,914 A | 5/1990 | Morizumi et al. | |
| 5,066,062 A | * 11/1991 | Sekulovski | 296/97.22 |
| 5,076,622 A | * 12/1991 | Detweiler | 292/201 |
| 5,080,421 A | * 1/1992 | Otowa et al. | 296/97.22 |
| 5,538,312 A | * 7/1996 | Lehmkuhl | 296/97.22 |
| 5,661,811 A | * 8/1997 | Huemann et al. | 381/309 |
| 5,697,236 A | * 12/1997 | Kleefeldt et al. | 70/257 |
| 5,906,405 A | * 5/1999 | Cooper | 296/97.22 |
| 6,260,544 B1 | 7/2001 | Spry et al. | |
| 6,352,295 B1 | * 3/2002 | Leitner | 296/97.22 |
| 6,554,344 B2 | * 4/2003 | Son | 296/97.22 |

FOREIGN PATENT DOCUMENTS

| | | |
|---|---|---|
| EP | 0 373 799 | 1/1989 |
| WO | WO 99/10192 | 4/1999 |

* cited by examiner

Primary Examiner—D. Glenn Dayoan
Assistant Examiner—Patricia Engle
(74) Attorney, Agent, or Firm—Morgan Lewis & Bockius LLP

(57) ABSTRACT

A simple, multifunction structure is provided for opening fuel filler door and for detecting the open position of the fuel filler door. Further, an elastic member furnishes a force for opening the fuel filler door and is protected from the external environment. Accordingly, the manufacturing process is simplified.

11 Claims, 6 Drawing Sheets

FUEL FILLER DOOR ASSEMBLY OF A VEHICLE

FIELD OF THE INVENTION

The present invention relates to a fuel filler door assembly for a vehicle. More particularly, the present invention relates to a fuel filler door assembly that notifies the driver of the position of the door.

BACKGROUND OF THE INVENTION

Conventionally, a fuel filler door is located toward the rear of a vehicle. Typically, the driver manipulates a lever, or the like near the driver's seat to open the fuel door. Thereafter a door catch is actuated, releasing the fuel filler door. After filling the fuel the fuel filler door is manually pushed closed until the door is reconnected to the door catch. Furthermore, some conventional vehicle models have an electric switch for sensing whether the fuel door is closed, and if not, alerting the driver that the door is open.

A drawback of the conventional system is the number of separate component parts associated with the system. This requires additional work to install the separate components, which increases the cost of manufacturing and the finished product, while decreasing productivity. Furthermore, the conventional door spring is susceptible to the external weather conditions and traditionally fails due to corrosion and wear.

SUMMARY OF THE INVENTION

The present invention discloses a fuel filler door assembly with a more efficient and less expensive means of indicating whether it is closed or not to the driver. Also, the present invention discloses an assembly that is potentially more resistant to the weather and elements as to produce a longer life span.

In accordance with an embodiment of the present invention, the fuel filler door assembly includes a straight rod installed on a vehicle body. The straight rod linearly slides and pushes the inside of the fuel filler door. Also, an elastic member for elastically supporting the straight rod while it pushes the inside of the fuel filler door. Furthermore, two electric conductors are included for performing shiftable contacts that depend on the position of the straight rod in relative to the vehicle body.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
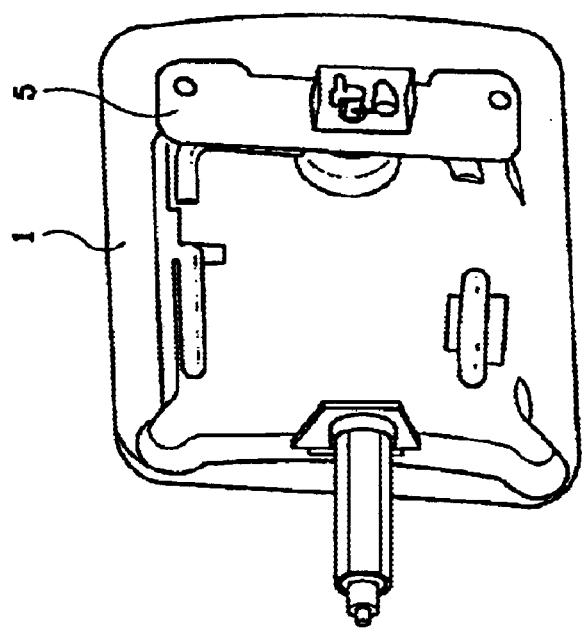
FIG. 1 shows an embodiment of the fuel filler door according to an embodiment of the present invention.
Figure 2:
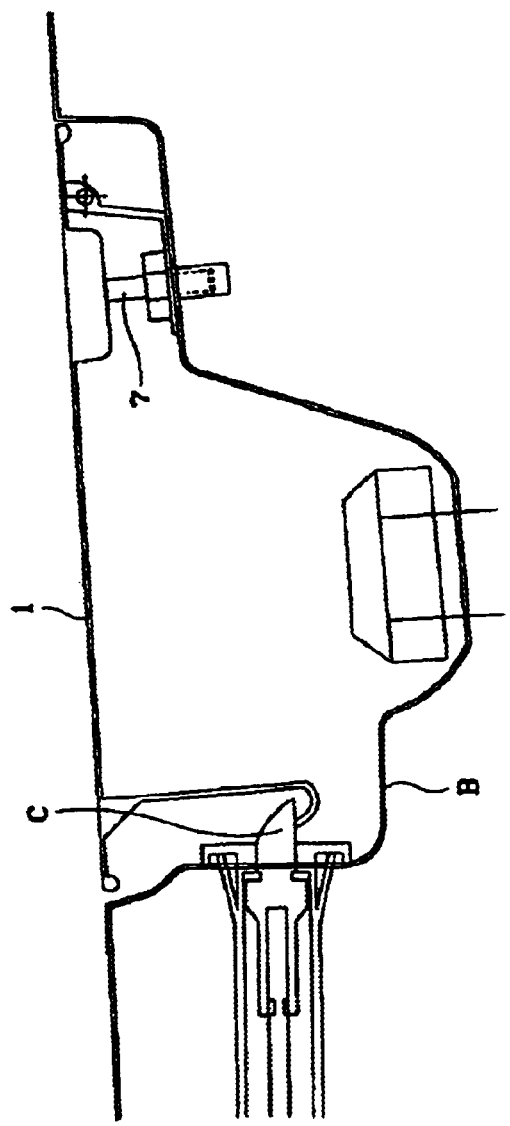
FIG. 2 is a sectional view showing an embodiment of the fuel filler door of FIG. 1.
Figure 3:
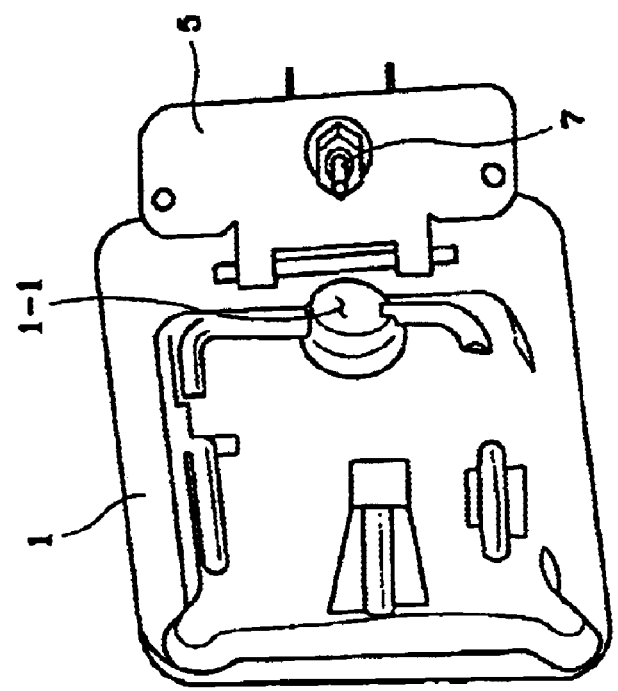
FIG. 3 shows the fuel filler door of FIG. 1 in an open position according to an embodiment of the present invention.

FIG. 1 shows an embodiment of the fuel filler door assembly according to an embodiment of the present invention. A hinge bracket attaches the fuel filler door 1 to the vehicle body. Referring to FIG. 2, the fuel filler door 1 is shown in cross-section in a closed position.

According to FIGS. 2 and 4–6, a vehicle fuel filler door 1 has a hinge pin 3 and a hinge bracket for attaching the fuel filler door 1 to the vehicle body. A straight rod 7 is installed on the vehicle body B that linearly and slidably pushes the inside of the fuel filler door 1. Also included is an elastic member for elastically supporting the straight rod 7 when the straight rod 7 pushes the inside of the fuel filler door 1.

Figure 4:
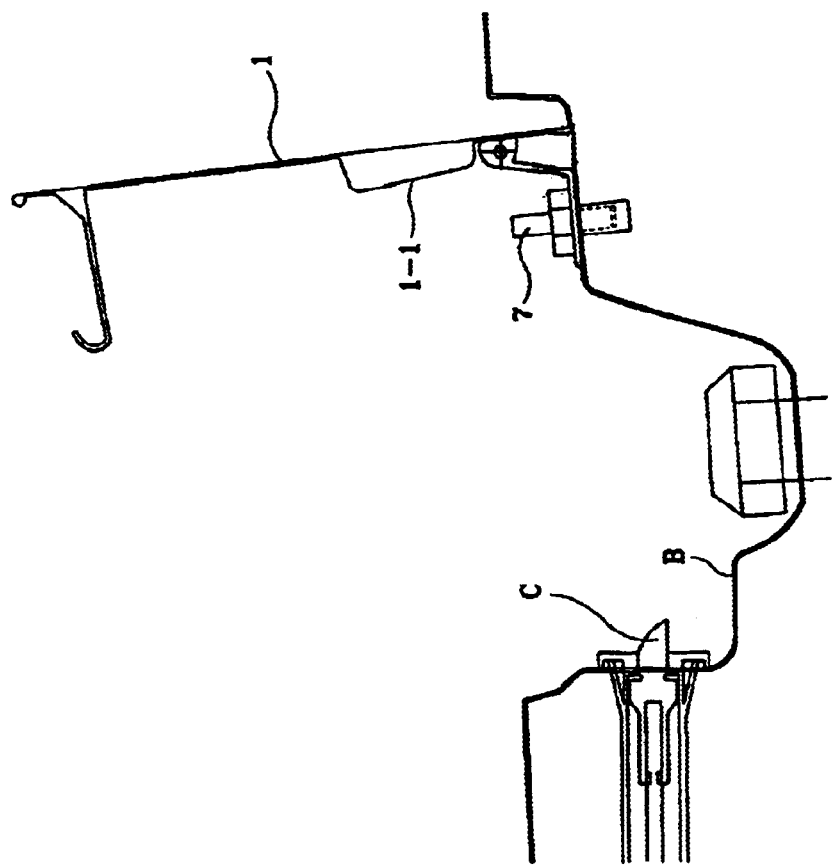
FIG. 4 is a sectional view showing an embodiment of the fuel filler door of FIG. 3.
Figure 5:
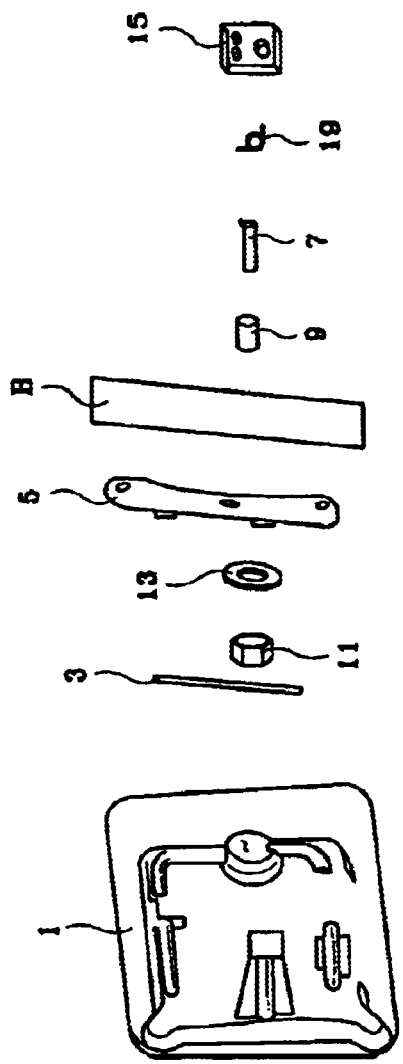
FIG. 5 is an exploded perspective view of the fuel filler door of FIGS. 1 to 4.

In a preferred embodiment the straight rod 7 passes through the hinge bracket and the vehicle body B (FIG. 4). Further, the guide bolt 9 passes through the hinge bracket and the vehicle body B. The straight rod 7 slides through the guide bolt 9. The guide bolt 9 is secured to the vehicle body B by a fastening nut 11 and a washer 13 (FIGS. 4 and 5). A boss 1—1 is formed on the inside of the fuel filler door 1 for receiving the force of the straight rod 7.

It is preferable that a switch bracket 15 is located on the inside of the vehicle body B near the position where the straight rod 7 is installed. An elastic member is installed on the switch bracket 15. The elastic member consists of a torsion spring 19, with one end being pivotally connected to the straight rod 7. The other end of the torsion spring 19 is secured to the switch bracket 15. Furthermore, the torsion spring 19 center coil portion is rotatably fitted to the switch bracket 15.

Figure 6:
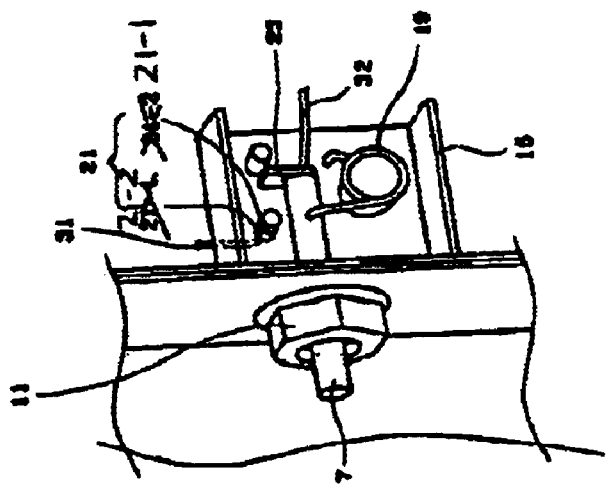
FIG. 6 shows a switch assembly of the fuel filler door according to an embodiment of the present invention.

Two electric conductors are included on the fuel filler door assembly. The electric conductors shift their contacts in accordance with the linear sliding of the straight rod 7 in relation to the vehicle body B. Thus, the open position of the fuel filler door 1 is detected through the opening of the door by the straight rod 7. The electric conductors also include a pair of terminal pins 21 and the terminal plate 23 (FIG. 6). The stroke of the straight rod 7 is limited between the pair of the terminal pins 21. In a preferred embodiment, the pair of terminal pins 21 consists of nonconductive part 21-1 secured to the switch bracket 15 for electrical insulation and a conductive part 21-2 for contacting the terminal plate 23. A first electric wire 31 is connected to the conductive part 21-2. A second electric wire 32 is connected to the terminal plate 23 of the straight rod 7.

A circuit is completed between the first electric wire 31 and the second electric wire 32 by the straight rod 7, the conductive part 21-2, and the terminal plate 23. Thus, a display is illuminated in the driver's compartment indicating the fuel filler door 1 in the open position. In an alternative embodiment, a packaged switch or an electric contact structure can be used to turn on or off the sliding state of the straight rod 7.

Referring to FIGS. 2 and 4, a door catch C holds the fuel filler door 1 against the force of the torsion spring 19. Upon manipulating a release lever, the catch is removed and the force of the torsion spring 19 and straight rod 7 open the fuel filler door 1. The straight rod 7 slidably pushes upon the boss 1—1 until the terminal plate 23 contacts the conductive part 21-2 of the terminal pin. When the terminal plate 23 contacts the conductive part 21-2, a circuit is formed between the first and second electric wires 31 and 32. Thereafter, a display lamp will be lit near the driver's compartment indicating the open state of the door. Therefore, the driver will know the position of the fuel filler door 1.

To close the fuel filler door 1, the fuel filler door 1 is manually pushed toward the vehicle body B. The pushing force must push the straight rod 7 against the force of the torsion spring 19. The door then remains closed when the door catches the door catch C. When the fuel filler door 1 is closed, the terminal plate 23 is removed from the conductive part 21-2 of the terminal pin. Therefore, the first and second electric wires 31 and 32 become disconnected, and the display lamp near the driver's seat is extinguished.

It is preferred that the torsion spring 19 is positioned within the vehicle body B, such that the torsion spring 19 is housed away from the external weather conditions, thereby extending the fuel filler door's 1 useful life.

The foregoing descriptions of embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A fuel filler door assembly for a vehicle, comprising:
    a straight rod installed through a vehicle body that linearly slides substantially perpendicular to an outer surface of a fuel filler door when said fuel filler door is in a closed position, and pushes the inside of said fuel filer door;
    an elastic member for elastically supporting said straight rod when pushing the inside of said fuel filler door; and
    two electric conductors for performing shiftable contacts depending on the sliding status of said straight rod relative to the vehicle body.

2. The fuel filler door assembly as claimed in claim 1, wherein said elastic member consists of a torsion spring, with one end pivotally connected to said straight rod, the other end secured to a switch bracket secured to the vehicle body, and with its coil portion being rotatably fitted to said switch bracket.

3. The fuel filler door assembly as claimed in claim 1, wherein said fuel filler door is provided with a boss on an inside surface for effectively receiving the force from said straight rod.

4. A fuel filler door assembly for a vehicle, comprising:
    a straight rod installed through a vehicle body that linearly slides and pushes the inside of a fuel filler door;
    an elastic member for elastically supporting said straight rod when pushing the inside of said fuel filler door;
    two electric conductors for performing shiftable contacts depending on the sliding status of said straight rod relative to the vehicle body, wherein said electric conductors comprise:
        a pair of terminal pins for limiting the stroke of said straight rod between the pair of said terminal pins when said straight rod pushes said fuel filler door forced by said elastic member; and
    a terminal plate protruding from an end of said straight rod.

5. The fuel filler door assembly as claimed in claim 4, wherein said terminal pins comprise:
    a nonconductive part secured to said switch bracket, for securing a proper electric insulation; and
    a conductive part for making contact with said terminal plate.

6. A fuel filler door assembly for a vehicle, comprising:
    a straight rod installed through a vehicle body that linearly slides and pushes the inside of a fuel filler door;
    an elastic member for elastically supporting said straight rod when pushing the inside of said fuel filler door; and
    two electric conductors for performing shiftable contacts depending on the sliding status of said straight rod relative to the vehicle body;
    wherein said straight rod is installed through a hinge bracket and said vehicle body wherein said binge bracket hinge-supports said fuel filler door.

7. The fuel filler door assembly as claimed in claim 6, further comprising:
    a guide bolt installed through said hinge bracket and said vehicle body defining a guide hole so that the straight rod can linearly slide therein; and
    a fastening nut for fastening said guide bolt.

8. A fuel filler door assembly for a vehicle, comprising:
    a first and second wire;
    a rod with a protruding conducting member attached to said second wire and extending from a vehicle body;
    a spring coupled with said rod configured to translate said rod in a linear direction such that an end of said rod contacts and pushes open a fuel filler door of a vehicle; and
    a first and second electrical terminal pin wherein said first electrical terminal pin is coupled with said first wire such that a circuit is formed between said first wire and said second wire when the protruding conducting member of said rod contacts said first electrical terminal pin.

9. The assembly of claim 8 further comprising a light positioned within a driver's compartment and coupled with said circuit such that said light is illuminated when the protruding conducting member of said rod contacts said first electrical terminal pin.

10. The assembly of claim 8 further comprising a catch configured to latch with the fuel filler door such that the door is held closed against the linear force generated on said rod by said spring.

11. The assembly of claim 10 further comprising a lever positioned near a driver's compartment coupled with said catch of the fuel filler door.

* * * * *